US008248364B1

(12) United States Patent
Chi et al.

(10) Patent No.: US 8,248,364 B1
(45) Date of Patent: *Aug. 21, 2012

(54) SEEING WITH YOUR HAND

(75) Inventors: Liang-Yu Chi, Mountain View, CA (US); Robert Allen Ryskamp, Mountain View, CA (US); Luis Ricardo Prada Gomez, Mountain View, CA (US); Harvey Ho, Mountain View, CA (US); Sergey Brin, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/194,622

(22) Filed: Jul. 29, 2011

Related U.S. Application Data

(63) Continuation of application No. 13/047,160, filed on Mar. 14, 2011, now Pat. No. 8,009,141.

(51) Int. Cl.
*G09G 5/00* (2006.01)
(52) U.S. Cl. .................................. 345/156; 345/158
(58) Field of Classification Search .......... 345/156–158, 345/169; 715/856, 863; 382/103; 348/155, 348/169, 208.99, 208.1–208.4, 208.14; 463/37–39
See application file for complete search history.

(56) References Cited

U.S. PATENT DOCUMENTS

| 7,129,927 | B2 | 10/2006 | Mattsson |
| 7,173,604 | B2 * | 2/2007 | Marvit et al. ................. 345/156 |
| 7,548,256 | B2 * | 6/2009 | Pilu ............................ 348/208.3 |
| 7,843,425 | B2 | 11/2010 | Lu et al. |
| 7,862,522 | B1 | 1/2011 | Barclay et al. |
| 7,877,707 | B2 | 1/2011 | Westerman et al. |
| 7,878,408 | B2 | 2/2011 | Lapstun et al. |
| 2006/0181510 | A1 * | 8/2006 | Faith ............................. 345/158 |
| 2010/0063794 | A1 | 3/2010 | Hernandez-Rebollar |
| 2010/0099464 | A1 | 4/2010 | Kim |
| 2011/0032187 | A1 | 2/2011 | Kramer et al. |

OTHER PUBLICATIONS

Sturman et al., "A Survey of Glove-Based Input." IEEE Computer Graphics and Applications, Jan. 1994. pp. 30-39.
Nolker et al. "Detection of Fingertips in Human Hand Movement Sequences." Department of Computer Science, Bielefeld University. Lecture Notes in Computer Science, 1998.
Pamplona et al. "The Image-Based Data Glove." Proceedings of X Symposium on Virtual and Augmented Reality. 2008.
"VirtualHand for Catia V5." CyberGlove Systems. Copyright 2010.

* cited by examiner

*Primary Examiner* — Regina Liang
(74) *Attorney, Agent, or Firm* — McDonnell Boehnen Hulbert & Berghoff LLP

(57) ABSTRACT

The disclosure describes methods and systems for gathering and conveying information, for example, such as with a hand of a user. In one embodiment, the method may include using a detector to record a series of images of an environment and detecting a predetermined motion by comparing two or more images in the series. The method may include selecting a function based on the predetermined motion and triggering the function. In another embodiment, the method may include using a first detector to record a first series of images of an environment and using a second detector to record a second series of images of an environment. The method may include detecting a predetermined relative motion by comparing one or more images from the first series with one or more images from the second series, and selecting and/or triggering a function based on the predetermined relative motion.

16 Claims, 11 Drawing Sheets

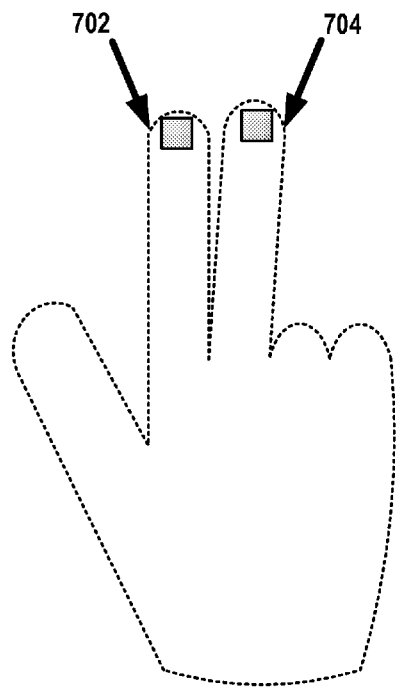
FIG. 7A
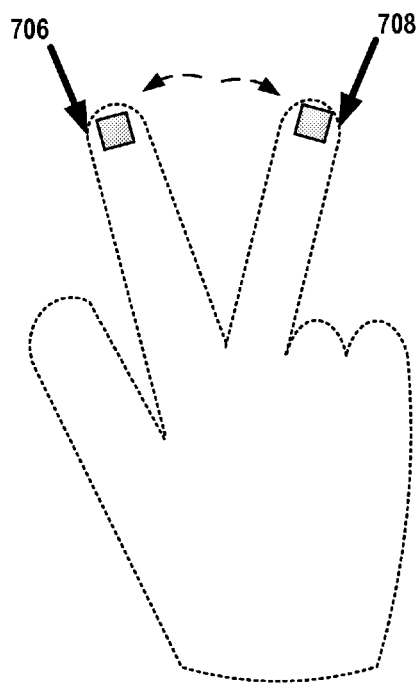
FIG. 7B
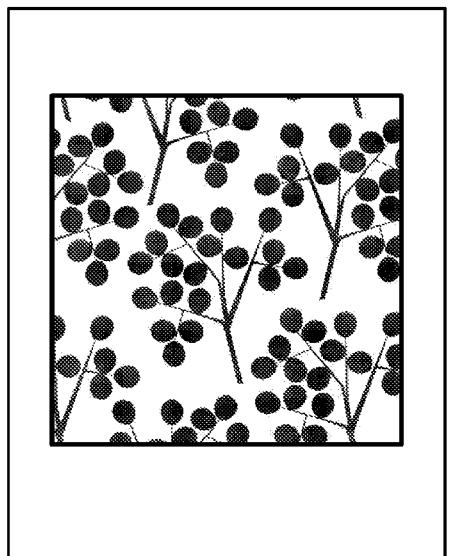
710 FIG. 7C
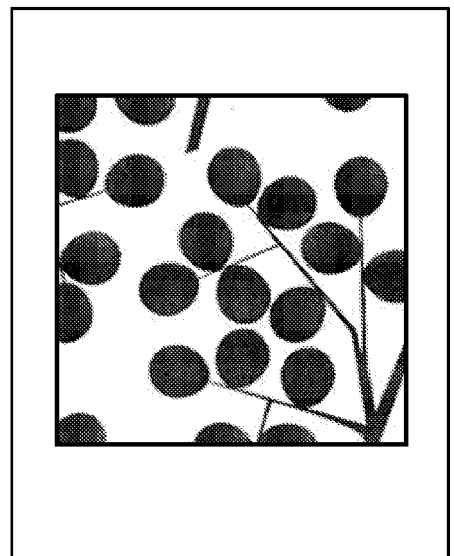
712 FIG. 7D

SEEING WITH YOUR HAND

CROSS-REFERENCE TO RELATED APPLICATION

This application is a continuation of U.S. patent application Ser. No. 13/047,160 filed Mar. 14, 2011, the contents of which are hereby incorporated by reference.

BACKGROUND

Humans naturally use their hands and fingers as a means of gathering information. For example, when moving in a dark environment, humans naturally put their hands out to gather information about their surroundings by touch. Similarly, when a small object is lost, for example, underneath a couch, humans naturally put their hands under the couch to locate the lost object by touch. While gathering information by touch is in some cases an acceptable substitute for seeing, in many situations it may be desirable to "see" the inaccessible environment to better gather information.

In addition to gathering information, humans also naturally use their hands and fingers to convey information. For example, when giving someone directions to a location, many humans naturally use one or more fingers to point towards the location. Similarly, when discussing a particular object, many humans naturally use one or more fingers to point to the object. However, typically the amount and types of information that can be conveyed by a human's hands is limited to specific contexts.

SUMMARY

Devices and methods for gathering and conveying information with a hand are described. In one example, to allow a user to "see" an inaccessible environment, a user may wear a device equipped with one or more detectors on one of his or her hands, or on other areas of the user's body. The detector(s) may record a series of images of the environment, and a display may display the series of images to the user. In this manner, the user may "see" the inaccessible environment as if the user's eyes were located on the user's hand or finger, or on the other area of the user's body. Alternately or additionally, motion of the detector(s) may be determined by comparing images in the recorded series of images, and one or more predetermined motions may detected among the predetermined motion. One of more functions may be triggered based on detection of the one or more predetermined motions.

In an embodiment, a glove is provided that may include a detector positioned on a fingertip of the glove. The detector may be configured to record a series of images of an environment. The glove may additionally include a processor configured to determine at least one predetermined motion of the detector by comparing at least two images in the series of images and, based on the at least one predetermined motion, select at least one function from a plurality of functions. Additionally, the glove may include an output interface configured to trigger the at least one function.

In another embodiment, a wearable device is provided that may include a detector configured to record a first series of images of an environment. The wearable device may also include and a processor configured to stabilize the first series of images to produce a first stabilized series of images, determine at least one predetermined motion of the detector by comparing at least two images in the first stabilized series of images, and, based on the at least one predetermined motion, select a first at least one function from a plurality of functions. The wearable device may additionally include an output interface configured to transmit an output based at least in part on the first at least one function.

In another embodiment, a method may include recording a first series of images of an environment with a first wearable detector, stabilizing the first series of images to produce a stabilized first series of images, and determining at least one predetermined motion by comparing at least two images in the first stabilized series of images. The method may further include maintaining a first set of correlations between a plurality of predetermined motions and a first plurality of functions and identifying the at least one predetermined motion in the first set of correlations so as to determine a first at least one function associated with the at least one predetermined motion.

Other embodiments are described below. The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIGS. 7a-7d show an example application of an example system detecting relative motion with two detectors.

DETAILED DESCRIPTION

The following detailed description describes various features and functions of the disclosed systems and methods with reference to the accompanying figures. In the figures, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

1. Overview of a Device and System

Figure 1:
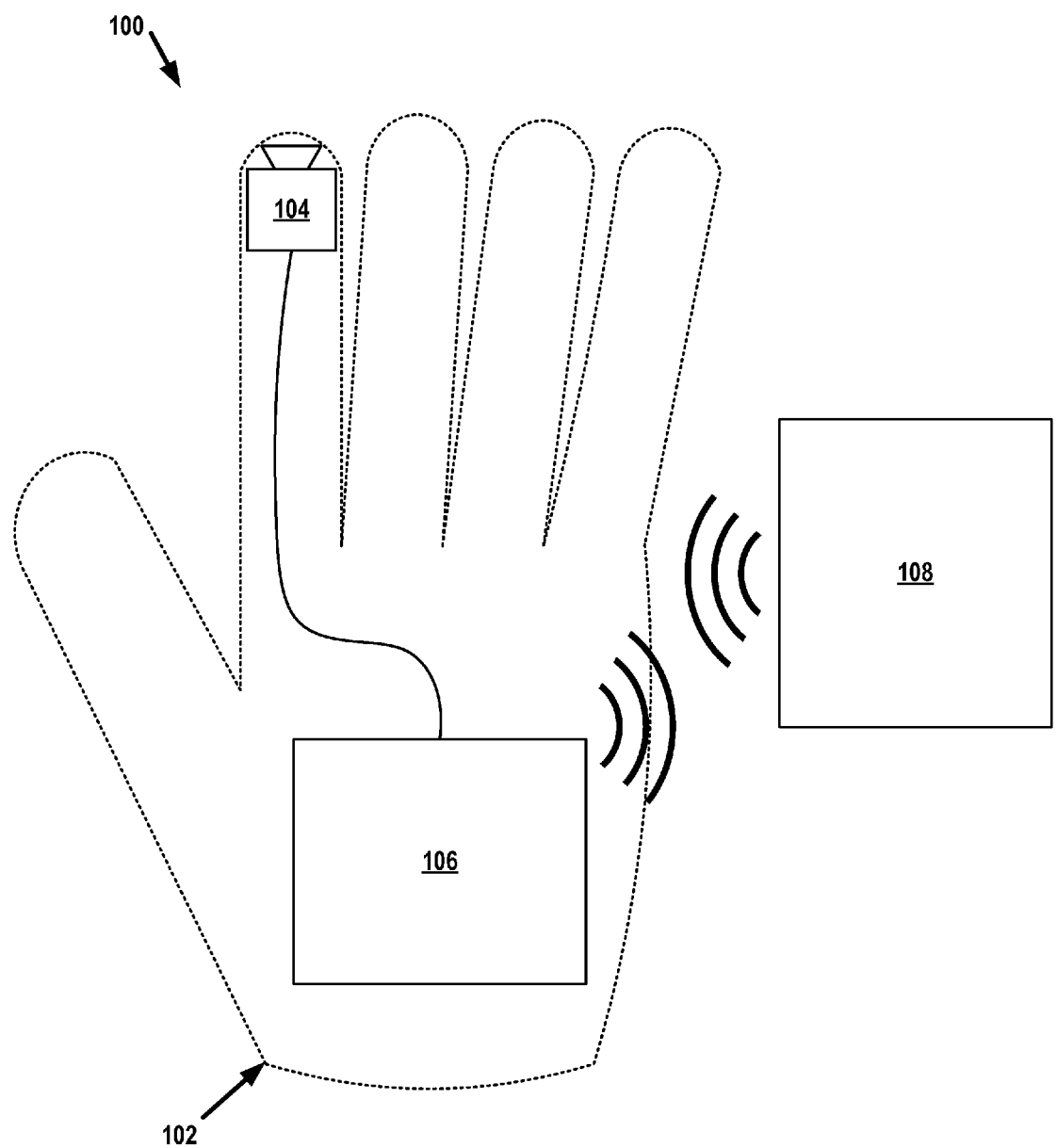
FIG. 1 shows an overview of an embodiment of an example system.

FIG. 1 shows an embodiment of an example system. As shown, the system 100 includes a wearable apparatus 102 including a detector 104 and a processor 106. The system 100 also includes a display 108.

The size and shape of the wearable apparatus 102 shown in FIG. 1 are merely illustrative and are not meant to be limiting. Other sizes and shapes of the apparatus 102 are possible as well. As an example, while the wearable apparatus 102 is shown as a glove, it is to be understood that the wearable apparatus 102 is representative of any number of wearable apparatuses. In some embodiments, the wearable apparatus 102 may be wearable on a hand, wrist, or finger of a user. The wearable apparatus 102 may be worn on other areas of a user's body as well, such as a foot, hip, or back of a user. Other areas of a user are possible as well. Examples of wearable apparatuses include wristbands, watches, rings, and mittens. Other wearable apparatuses are possible as well.

Similarly, the size, shape, and location of the detector 104 shown in FIG. 1 are merely illustrative and are not intended to be limiting. Other sizes, shapes, and locations of the detector 104 are possible as well. As an example, while the detector 104 is shown to be located on a fingertip of an index finger of the wearable apparatus 102, other locations of the detector 104 are possible as well. For instance, the detector 104 could be located on a different fingertip or elsewhere on the wearable apparatus 102. The wearable apparatus 102 may include one or more additional detectors as well.

Similarly, the size, shape, and location of the processor 106 shown in FIG. 1 is merely illustrative and is not intended to be limiting. Other sizes, shapes, and locations of the processor 106 are possible as well. As an example, while the processor 106 is shown to be located on the palm area or the back of the glove 102, other locations of the processor 106 are possible as well. For instance, the processor 106 could be integrated into the detector 104 on the wearable apparatus 102, or could be located elsewhere on the wearable apparatus 102. Alternately, the processor 106 could be located remote from the wearable apparatus 102, such as on another wearable apparatus worn elsewhere on a user's body, on an apparatus not worn by the user, or as stand-alone device.

Similarly, the size, shape, and location of the display 108 shown in FIG. 1 are merely illustrative and are not intended to be limiting. Other sizes, shapes, and locations of the display 108 are possible as well. As an example, while the display 108 is shown to be located in proximity to the wearable apparatus 102, other locations of the display 108 are possible as well. For instance, the display 108 could be integrated into the wearable apparatus 102. Alternately, the display 108 could be located remote from the wearable apparatus 102, such as on another wearable apparatus worn elsewhere on a user's body, on an apparatus not worn by the user, or as stand-alone device.

In general, the detector 104 may be positioned on the wearable apparatus 102 to have a line of sight to an environment surrounding the wearable apparatus 102. The detector 104 may be configured to record one or more series of images of the environment surrounding the wearable apparatus 102, and thus may include a camera. The detector 104 may also be configured to transmit the recorded series of images to the processor 106. To this end, the detector 104 may be communicatively coupled to the processor 106 by one or both of a wired link and a wireless link.

The processor 106 may include one or more processing elements such as one or more processors, data storage, and an output interface. The processor 106 may be configured to perform various types of image processing and analysis on the series of images received from the detector 102, as described below in connection with FIGS. 2, 4, and 6, for example. The processor 106 may additionally be configured to receive the series of images from the detector 104 and to transmit to the display 108 an output based at least in part on the series of images. To this end, the processor 106 may be communicatively coupled to the display 108 by one or both of a wired link and a wireless link.

The display 108 may be configured to display the output received from the processor 106. The display 108 may additionally be configured to display information received from one or more additional sources. The display 108 may be, for example, a heads-up display, a head-mounted display, a flat-panel display, a light-emitting diode (LED) display, an electroluminescent display (ELD), a liquid crystal display (LCD), an organic LED (OLED) display, or any other type of display now known or later developed.

2. First Example Device

Figure 2:
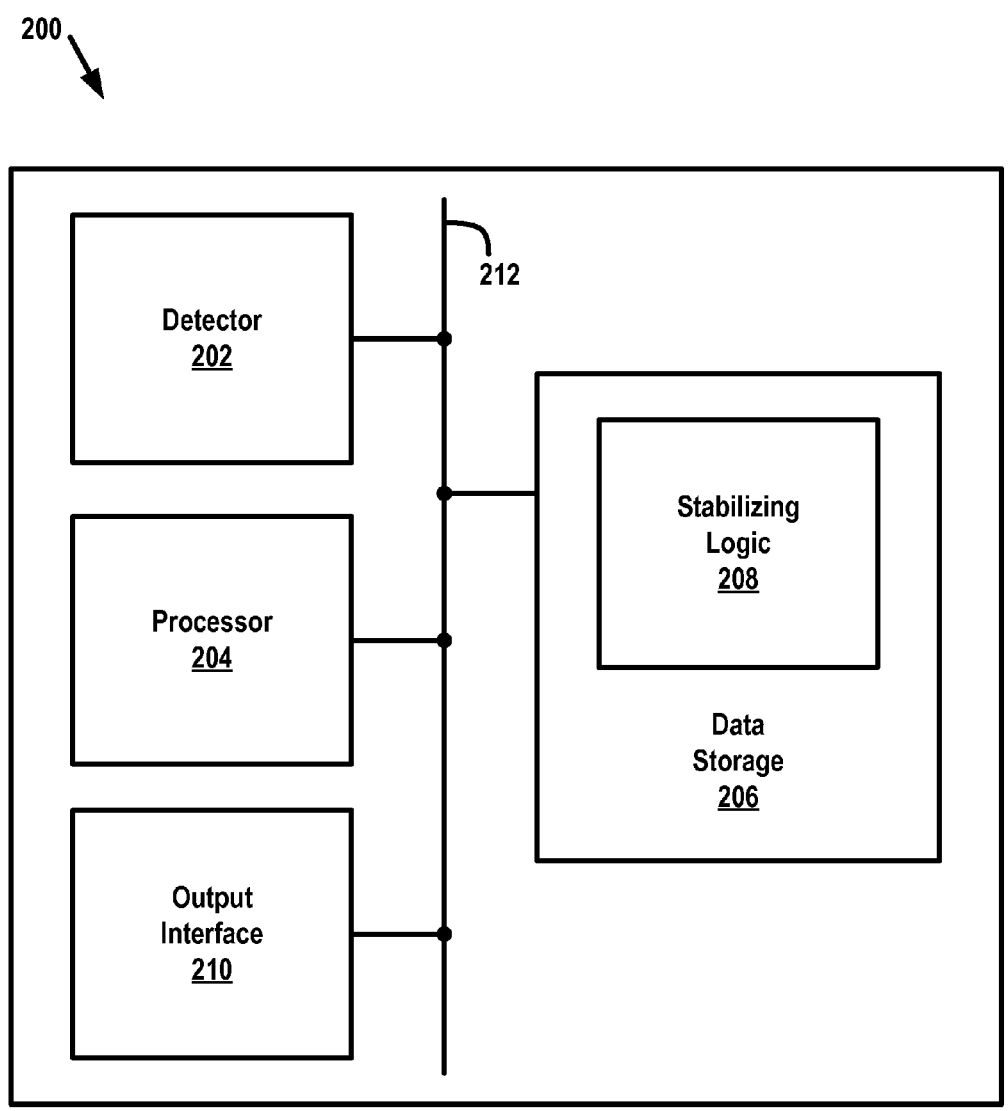
FIG. 2 shows a block diagram of an embodiment of an example device.

FIG. 2 shows a block diagram showing an embodiment of an example device. As shown, the device 200 includes a detector 202, a processor 204, data storage 206 in which is stored stabilizing logic 208, and an output interface 210. The elements of the device 200 are shown coupled by a system bus or other mechanism 212.

It is to be understood that, while each of the detector 202, the processor 204, the data storage 206, the stabilizing logic 208, and the output interface 210 are shown to be integrated into the device 200, the device 200 may, in some embodiments, comprise multiple devices among which the elements of device 200 are distributed. As an example, detector 202 may be separate from (but communicatively coupled to) the remaining elements of device 200. As another example, detector 202, processor 204, and output 210 may be integrated into a first device, while data storage 206 and the stabilizing logic 208 may be integrated into a second device that is communicatively coupled to the first device. In this example, the device 200 may comprise the first device and the second device. Other examples are possible as well.

The detector 202 may be, for example, a camera or other imaging device. In embodiments where the detector 202 is a camera, the camera may be configured to detect visible light, or may be configured to detect light from other portions of the spectrum, such as infrared or ultraviolet light, or x-rays. Other types of cameras are possible as well. The detector 202 may be a two-dimensional detector, or may have a three-dimensional spatial range. In some embodiments, the detector 202 may be enhanced through sensor fusion technology. In any case, the detector 202 is configured to record a series of images of an environment.

The processor 204 may be or may include one or more general-purpose processors and/or dedicated processors. The processor 204 may be configured to perform one or more types of image processing and analysis on the series of images recorded by the detector 202 so as to produce an output. In particular, the processor 204 may be configured to execute stabilizing logic 208 to stabilize the series of images.

While images gathered by a human's eyes are naturally stabilized by several reflexes of the human's eyes and brain (e.g., the vestibule-ocular reflex), the series of images recorded by the detector 202 may not be stable as a result of movement of the user and detector 202 during recording. Thus, it may be desirable in some embodiments for the processor 204 to stabilize the series of images.

To this end, the processor 204 may be configured to execute stabilizing logic 208 stored in the data storage to stabilize the series of images to produce a stabilized series of images. In general, the stabilizing logic may produce the stabilized series of images by modifying or removing one or more images in the series of images based on a detected orientation and/or motion of the detector 202. To this end, the device 200 may, in some embodiments, additionally include an orientation sensor such as a gyroscope or accelerometer to detect the orientation and/or motion of the detector 202. Other types of stabilization are possible as well, either instead of or in addition to the stabilizing logic, including lens-based stabilization (in which a floating lens element is controllable by electromagnets to move orthogonally to the optical axis of the lens to account for detected movement of the camera) and sensorshift stabilization (in which a sensor capturing the image is moved by an actuator to account for detected movement of the camera). In this example, the output may be the stabilized series of images.

In some embodiments, the detector 202 may be configured to perform optical and/or lens-based stabilization on the recorded series of images. This logic may be partially or wholly integrated into the detector 202, and may be used instead of or in addition to the stabilizing logic 208. In this example, the output may be the stabilized series of images.

The processor 204 may be configured to perform other types of image processing, correction and analysis as well, and the output may be further based on one or more of the other types of image processing, correction and analysis.

The output interface 210 may be configured to transmit the output to a display, such as the display shown in FIG. 1. To this end, the output interface 210 may be communicatively coupled to the display through a wired or wireless link. Upon receiving the output from the output interface 210, the display may display the output to a user. Through the display, the images seen by the detector 202 can be viewed by the user.

In some embodiments, the device 200 may also include a power supply, such as a battery pack or power adapter. In one embodiment, the device 200 may be tethered to a power supply through a wired or wireless link. Other examples are possible as well.

The device 200 may include elements instead of and/or in addition to those shown. For example, the device 200 may additionally include a flash or other illumination mechanism that is integrated into or separate from the detector 202. As another example, the device 200 may include one or more interfaces for communicating with one or more servers, hosts, or remote devices. Other examples are possible as well.

Figure 3B:
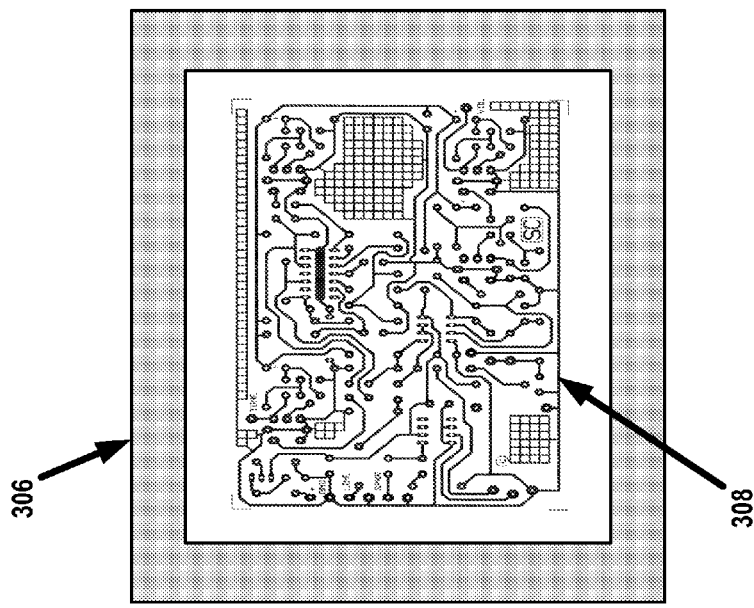
FIGS. 3a-3b show an example application of an example device.
Figure 3A:
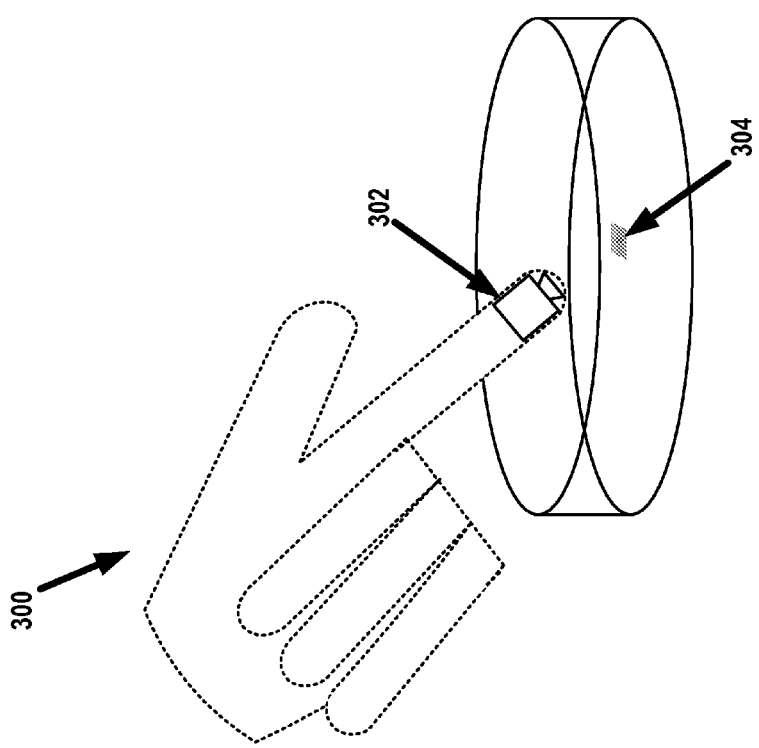

FIGS. 3a-3b show an example application of an example device. In particular, FIGS. 3a and 3b show a user using the example device to "see" a microchip having a number of small, fine detailed features. The elements of the device shown in FIGS. 3a and 3b may be similar to the elements described above in connection with FIG. 2.

In FIG. 3a, a user's hand is shown wearing a device 300. The device 300 may use a detector 302 located on the device 300 to record a series of images of an environment that includes the microchip. The detector 302 may transmit the series of images to a processer (not shown), such as the processors shown in FIG. 1 or 2, for example. In some embodiments, the processor may be integrated into the device 300. In other embodiments, the processor may be located remotely from the device 300.

Upon receiving the series of images, the processor may perform one or more types of image processing and analysis on the series of images. As an example, the processor may execute stabilization logic to stabilize the series of images to produce a stabilized series of images, as described above.

The processor may then transmit an output based on the stabilized series of images to a display. In this example, the output 308 may comprise the stabilized series of images.

In FIG. 3b, a display 306 is shown displaying the output 308 received from the processor. By viewing the output 308 on the display 306, the user may "see" a representation of the environment that is "seen" by the detector 302.

In embodiments where the processor performs additional types of image processing and analysis, the output 308 may comprise additional information, such as measurements of the microchip or a circuit diagram of one or more components of the microchip. Other examples are possible as well. The additional information may be provided to the display by the processor or by another device.

In this manner, a user may "see" an environment that includes small details that may not be visible to a user. In other applications, a user may use the device to "see" environments that are similarly or otherwise inaccessible. Other applications are possible as well.

3. Second Example Device

While the foregoing discussion has focused on a user using a detector to gather information, in other examples, a user may use one or more detectors to convey information. This may be further explained in connection with FIG. 4.

Figure 4:
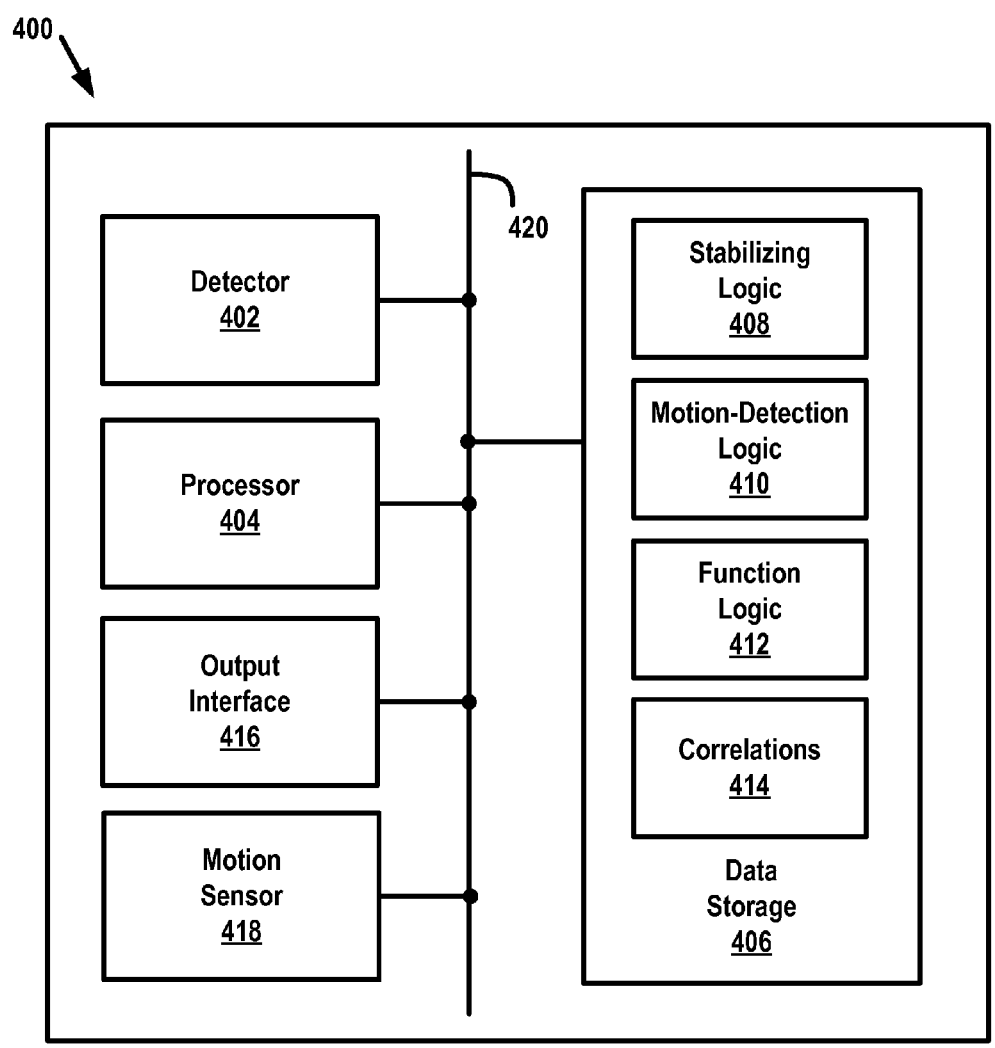
FIG. 4 shows a block diagram of an embodiment of an example device with additional logic processing functions.

FIG. 4 shows an embodiment of an example device with additional logic processing functions. As shown, the device 400 includes a detector 402, a processor 404, and data storage 406 in which is stored stabilizing logic 408, motion-detection logic 410, function logic 412, and correlations 414. The device 400 additionally includes an output interface 416 and a motion sensor 418. The elements of the device 400 are shown connected together by a system bus or other mechanism 420.

It is to be understood that, while each of the detector 402, the processor 404, the data storage 406, the stabilizing logic 408, the motion-detection logic 410, the function logic 412, the correlations 414, and the output interface 416, are shown to be integrated into the device 400, the device 400 may be, in some embodiments, made up of multiple devices among which the elements of device 400 are distributed, as described above.

The detector 402 may be any detector configured to record a series of images of an environment. The detector 402 may be, for example, any of the detectors described above.

The processor 404 may be or may include one or more general-purpose processors and/or dedicated processors. The processor 404 may be configured to execute one or more sets of logic stored in the data storage 406.

In particular, the processor 404 may be configured to execute stabilizing logic 408 to stabilize the series of images, as described above. To this end, the device 400 may additionally include one or more motion and/or orientation sensors (not shown), such as an accelerometer and/or a gyroscope.

Additionally, the processor 404 may be configured to execute motion-detection logic 410 to detect one or more motions of the detector 402. To this end, the device 400 may additionally include one or more motion and/or orientation sensors, which may be the same as, in addition to, or in place of the motion and/or orientation sensors described above in connection with the stabilizing logic 408. The processor 404 may be further configured to execute the motion-detection logic 410 to detect, among the detected motions, one or more predetermined motions or defined movements or gestures of the detector 402 by comparing one or more images recorded by the detector 402. The processor 404 may be further configured to execute the motion-detection logic 410 to detect a speed of the detected motions. Details of an example operation of the motion-detection logic are described in connection with FIGS. 5a-5d.

In some embodiments, the predetermined motions detected using the motion-detection logic may include linear motions, such as upward motion, downward motion, leftward motion, rightward motion, forward motion, backward motion, and no motion. In some embodiments, the predetermined motions may include circular motions, such as arcs and curves. In some embodiments, the predetermined motions may include a combination of motions, such as back-and-forth and start-stop-start motions. In some embodiments, the predetermined motions may include one or more swipes, shapes and/or characters, such as symbols or letters of the alphabet. Other predetermined motions are possible as well.

An example of detecting a predetermined motion is described below in connection with FIGS. 5a-5d.

The processor 404 may be further configured to execute function logic 412 to trigger one or more functions upon detection of particular predetermined motions. To this end, the function logic 412 may be executable by the processor to look up one or more detected predetermined motions in a set of correlations, such as correlations 414. Correlations 414 may be correlations between a plurality of predetermined relative motions and a plurality of functions. By looking up the one or more detected predetermined motions in the correlations 414, the processor 404 may determine one or more functions that are correlated with the predetermined motion(s).

In some embodiments, the functions may be tasks or subroutines that may be carried out by the processor 404 and displayed on a display or in one or more applications running on a display. One example of a function may be entering one or more characters in an application displayed by the display, such as a word processing, spreadsheet, or email application. Another example may be page zooming, such as zooming in or out on the display or on an application running on the display. Yet another example may be page scrolling and panning, such as scrolling up or down or panning left or right on the display or on an application running on the display. Still other examples may be moving an indicator on the display and selecting an object displayed by the display. Yet another example may be using image recognition to identify at least one object in the environment and displaying information related to the at least one object on the display. In other embodiments, the functions may be tasks or subroutines that may be carried out by the processor 404 but not displayed on the display. One example may be storing the recorded series of images in data storage. Other functions are possible as well.

In some embodiments, user-friendly correlations may be made between predetermined motions and functions. As an example, motion of the detector to the left may be correlated with a function of panning to the right on a display. As another example, no motion of the detector may be correlated with a function of using image recognition to identify an object located substantially in the center of one or more images in a series of images and displaying information related to the object. Other examples are possible as well.

Upon determining one or more functions that are correlated with the predetermined motion(s), the processor 404 may trigger the one or more functions by sending instructions to the display via the output interface 416. To this end, the output interface 416 may be communicatively coupled to the display via a wired or wireless link. An example of triggering a function based on detection of a predetermined motion is described below in connection with FIG. 5e.

While the correlations 414 are shown to be stored in the data storage 406 of the device 400, in some embodiments the correlations 414 may be stored remotely and may be accessible by the device 400. In some embodiments, the correlations 414 may be static and predefined by, for example, a manufacturer of the device. Alternately, the correlations 414 may be configured by a user during set-up or use of the device. Alternately, the correlations 414 may be automatically modified by the device itself. As an example, the processor 404 may be configured to "learn" new correlations through pattern recognition or other means. Other types of correlations are possible as well.

The device 400 may include elements instead of and/or in addition to those shown.

FIGS. 5a-5e show an example application of an example system implementing motion-detection logic. In particular, FIGS. 5a-5e illustrate a process of a processor executing motion-detection logic to detect a predetermined motion of the detector and using function logic to trigger a function upon detection of the predetermined motion. In this example, the motion-detection logic monitors and analyzes the images seen by the detector to determine that the detector has undergone a predetermined motion in the pattern of the letter "J". The images shown in the figures are merely illustrative and are not intended to be limiting in any way. In some contexts, the process described below may be referred to as "vector displacement."

Figure 5A:
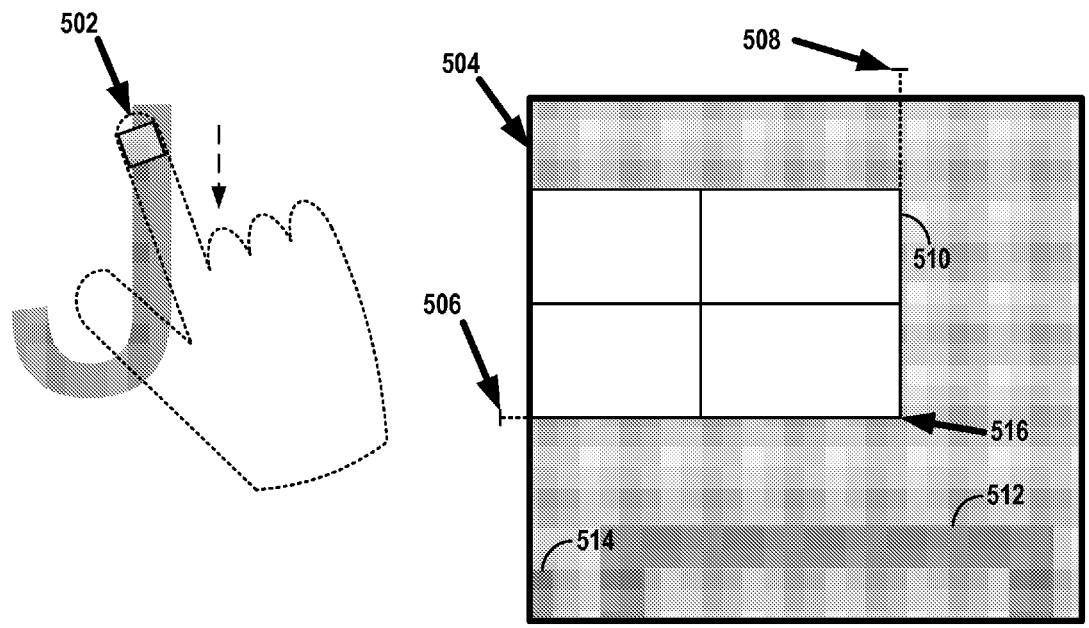
FIGS. 5a-5e show an example application of an example system implementing motion-detection logic.

In FIG. 5a, the detector is located at a first position 502. While at position 502, the detector records one or more images including the first image 504. As shown, the first image 504 includes three objects: a window 510, a table 512, and a chair 514. In order to detect motion of the detector, the processor may execute motion-detection logic to select one or more reference points within the first image 504 to be used in the motion-detection process. For example, the processor may select as a reference point 516 the bottom-right-hand corner of the window 514. The processor may determine a position of the reference point 516 within the first image 504, such as by determining a set of coordinates to describe the position. As shown, the reference point 516 has a vertical coordinate 506 and a horizontal coordinate 508.

Figure 5B:
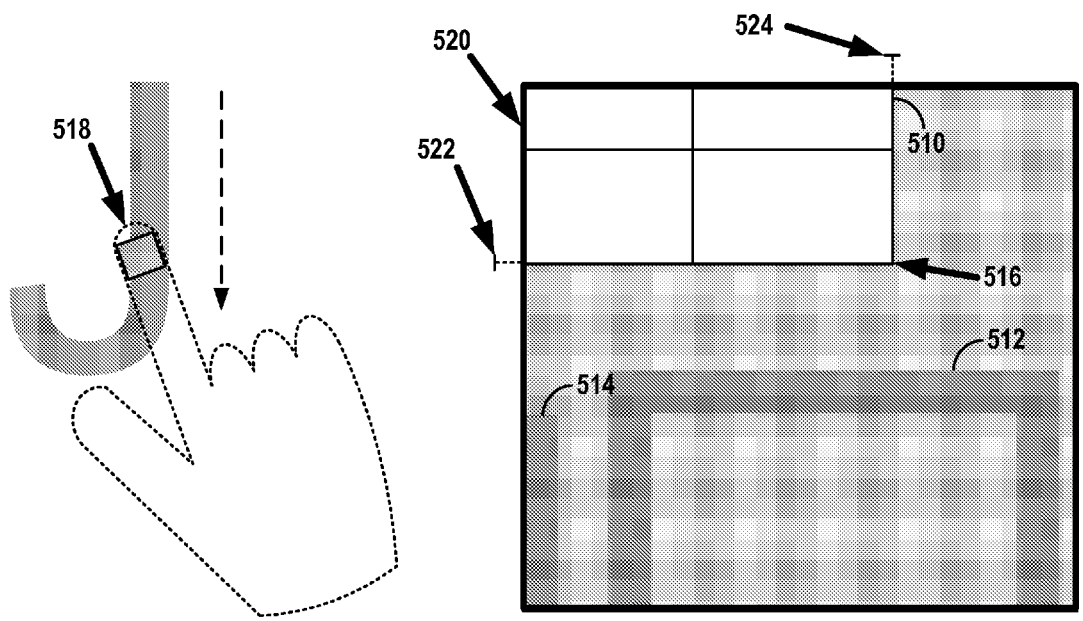

In FIG. 5b, the detector has moved to a second position 518. While at position 518, the detector records one or more images including the second image 520. As shown, the second image 520 includes the same three objects 510, 512, 514 as the first image 504, but as a result of the movement of the detector from the first position 502 to the second position 518, the objects 510, 512, 514 have each shifted to a new position within the second image 520. In particular, the reference point 516 (the bottom-right-hand corner of the window) has shifted to a new position within the second image 520. The processor may determine the new position of the reference point 516 by determining a second set of coordinates to describe the position. As shown, the reference point 516 now has a vertical coordinate 522 and a horizontal coordinate 524.

The processor may compare the first set of coordinates (506 and 508) with the second set of coordinates (522 and 524) to detect motion of the detector. For example, by comparing the vertical coordinates 506 and 522, the processor may determine that the reference point 516 has moved upwards in the second image 520 as compared to the first image 504. From this, the processor may detect that the detector has moved downward in space. Additionally, by comparing the horizontal coordinates 508 and 524, the processor may determine that the reference point 516 has not moved (or has moved very little) in a horizontal direction in the second image 520 as compared to the first image 504. From this, the processor may detect that the detector has not moved (or has moved very little) to the left or right in space.

Figure 5C:
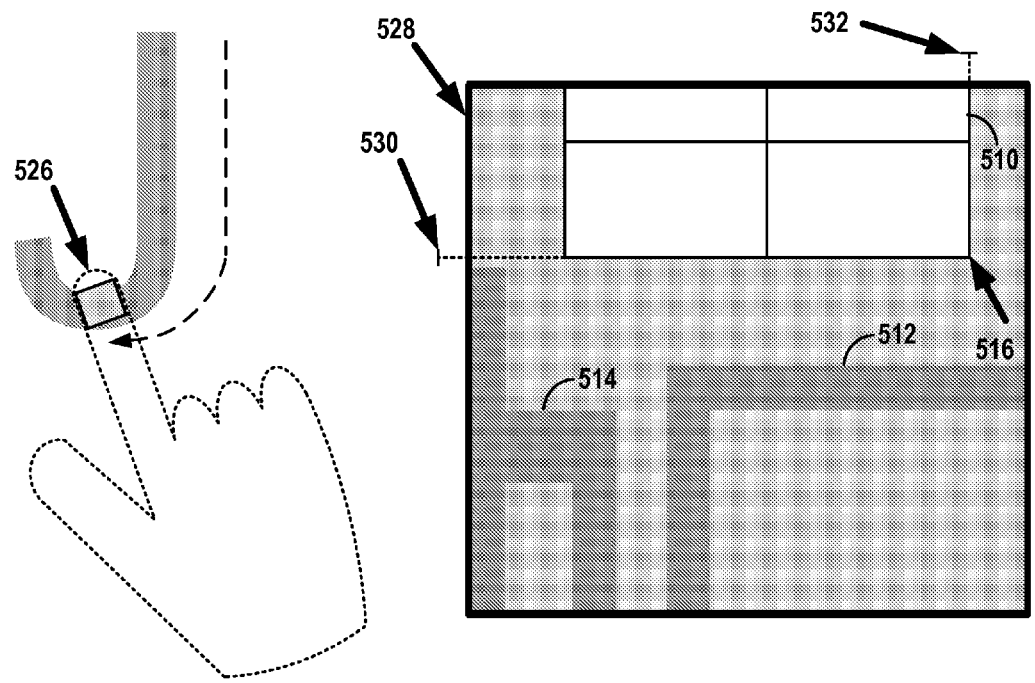

In FIG. 5c, the detector has moved to a third position 526 where the detector records one or more images including the third image 528. As described above, the processor may determine a third set of coordinates to describe a new position of the reference point 516 within the third image 528. As shown, the reference point 516 now has a vertical coordinate 530 and a horizontal coordinate 532.

The processor may compare the third set of coordinates to one or both of the first set of coordinates and the second set of coordinates. Based on the comparison(s), the processor may determine that the reference point 516 has moved upwards and to the right in the third image 528 as compared to the second image 520. From this, the processor may detect that the detector has moved downwards and to the left in space.

Figure 5D:
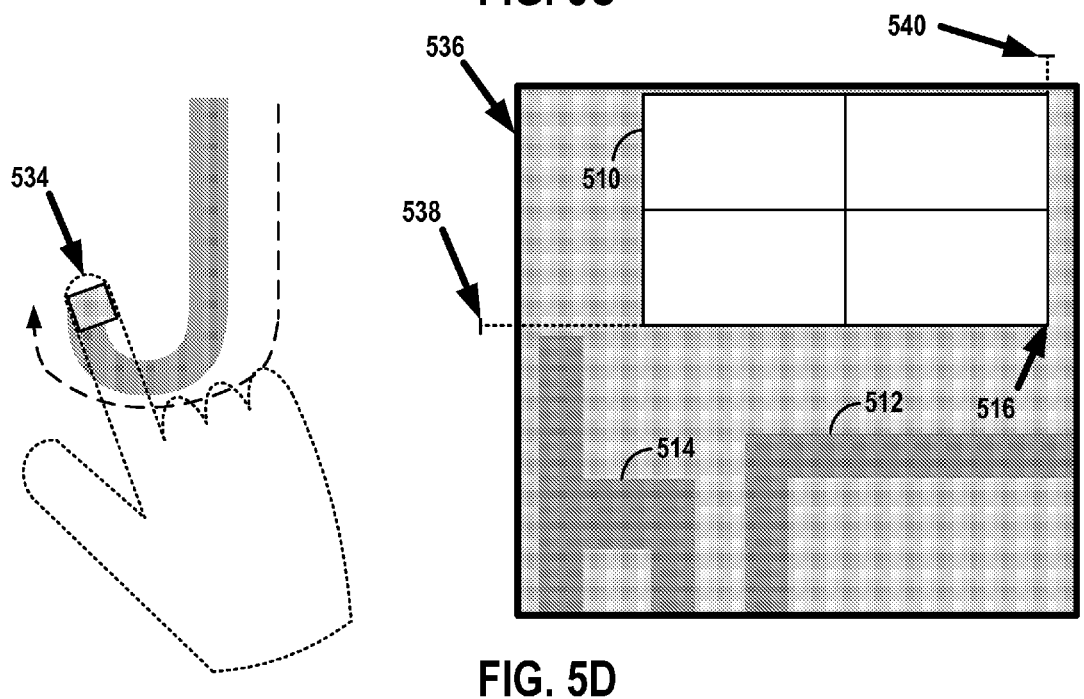

In FIG. 5d, the detector has moved to a fourth position 534 where the detector records one or more images including the fourth image 536. As described above, the processor may determine a fourth set of coordinates to describe a new position of the reference point 516 within the fourth image 536. As shown, the reference point 516 now has a vertical coordinate 538 and a horizontal coordinate 540.

The processor may compare the fourth set of coordinates to one or more of the first set of coordinates, the second set of coordinates, and the third set of coordinates. Based on the comparison(s), the processor may determine that the reference point 516 has moved downward and to the right in the fourth image 536 as compared to the third image 528. From this, the processor may detect that the detector has moved upwards and to the left in space.

While four positions of the detector are shown, it is to be understood that the same principle of motion detection may be applied to any number of positions. In the context of this example, there may be one or more positions before the first position 502, after the fourth position 534, and/or between each of the first, second, third, and fourth positions of the detector. In detecting motion of the detector, the processor may consider one or more reference positions and/or sets of coordinates determined from any additional positions.

In this manner, the processor may execute the motion-detection logic to detect motion of the detector. The processor may additionally execute the motion-detection logic to detect one or more predetermined motions among the detected motion of the detector. In the example, the processor may detect that the motion of the detector from the first position 502 to the fourth position 534 is the predetermined motion in the shape of a "J". Other predetermined motions are possible as well.

The processor may be additionally configured to look up the predetermined motion ("J") in a set of correlations in order to determine a function. In the example, the predetermined motion may be correlated with the function of entering the character "J" into an application running on a display.

Figure 5E:
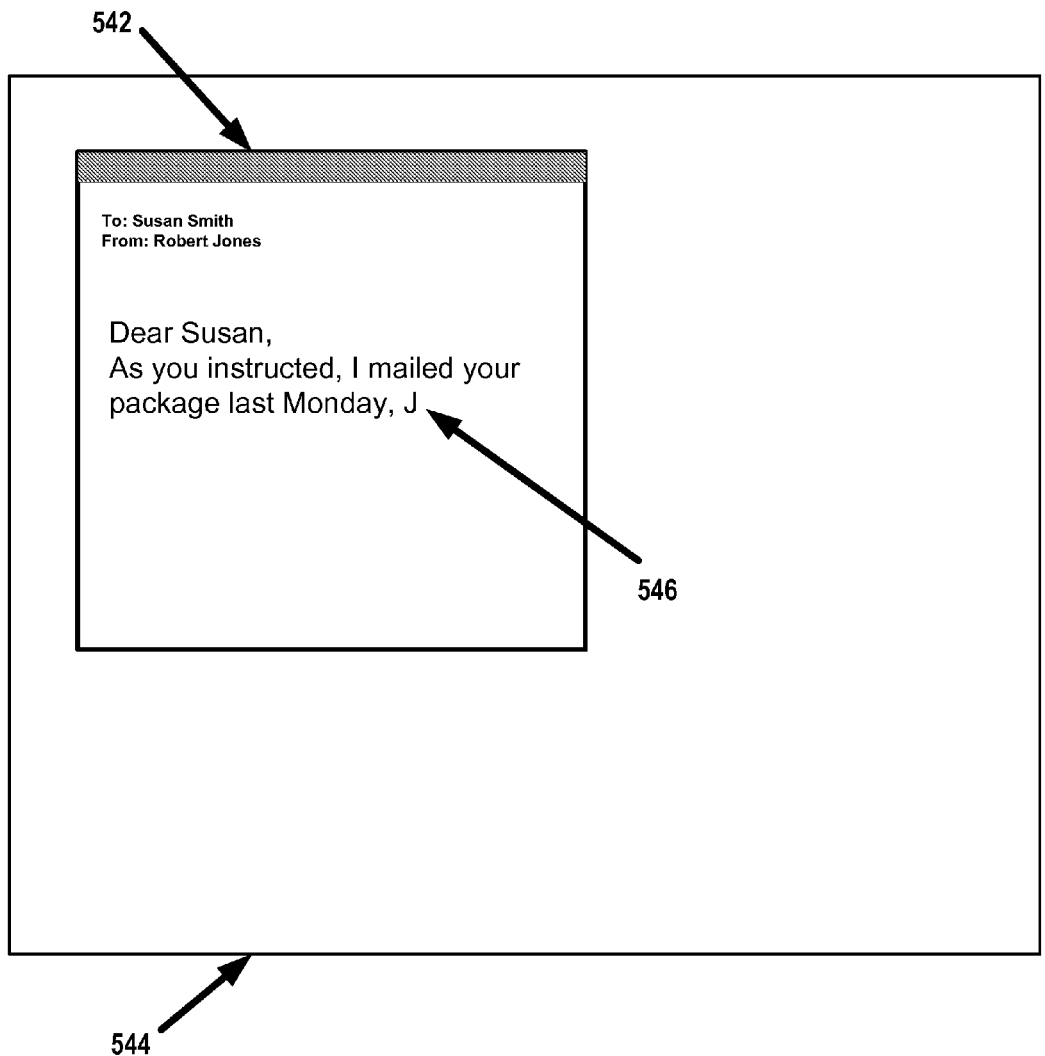

In FIG. 5e, an application 542 is shown running on a display 544. Upon detecting the predetermined motion ("J"), the processor may trigger the correlated function so that the character "J" 546 is entered in the application 542 running on the display 544.

The example shown in FIGS. 5a-5e is merely illustrative and is not meant to be limiting. Many other devices, predetermined motions, functions, and correlations between predetermined motions and functions are possible beyond those shown in FIGS. 5a-5e.

4. Third Example Device

While the foregoing has focused on devices that include only a single detector, in some embodiments a device may be equipped with two or more detectors. The inclusion of the additional detector(s) allows for detection of not only the individual motions of the two or more detectors, but also relative motion among the detectors.

Figure 6:
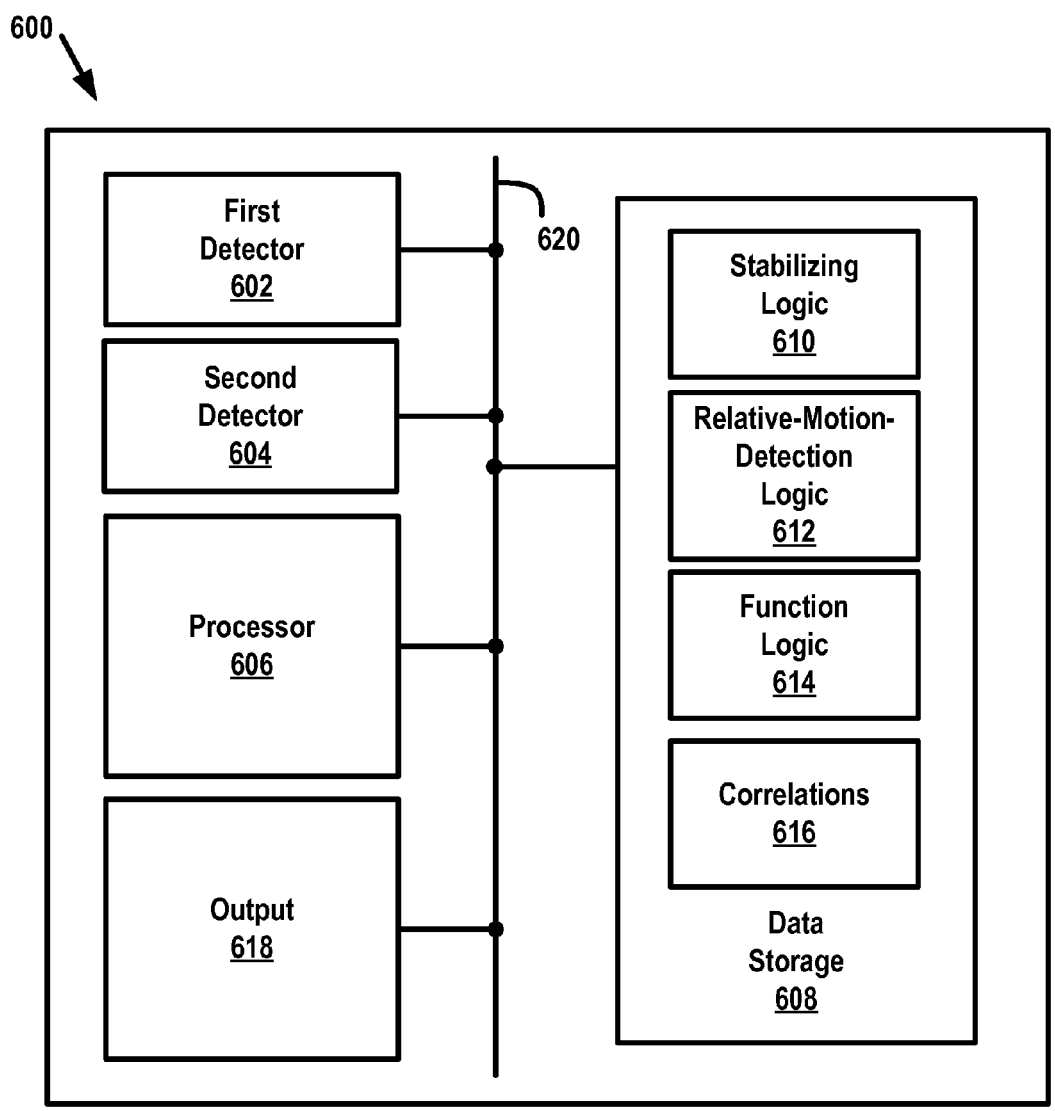
FIG. 6 shows a block diagram of an embodiment of an example device with more than one detector.

FIG. 6 shows an embodiment of an example device with more than one detector. As shown, the device 600 includes a first detector 602, a second detector 604, a processor 606, and data storage 608 in which is stored stabilizing logic 610, relative-motion-detection logic 612, function logic 614, and correlations 616. The device 600 additionally includes an output interface 618. The elements of the device 600 are shown connected together by a system bus or other mechanism 620.

It is to be understood that, while each of the first detector 602, the second detector 604, the processor 606, the data storage 608, the stabilizing logic 610, the relative-motion-detection logic 612, the function logic 614, the correlations 616, and the output interface 618 are shown to be integrated into the device 600, the device 600 may, in some embodiments, be made up of multiple devices among which the elements of device 600 are distributed, as described above.

The first detector 602 may be any detector configured to record a series of images of an environment. The first detector 602 may be, for example, any of the detectors described above.

Similarly, the second detector 604 may be any detector configured to record a series of images of an environment. The second detector 604 may be, for example, any of the detectors described above.

The processor 606 may be or may include one or more general purpose processors and/or dedicated processors. The processor 606 may be configured to execute one or more sets of logic stored in the data storage 608.

In particular, the processor 606 may be configured to execute stabilizing logic 610 to stabilize the series of images, as described above.

Additionally, the processor 606 may be configured to execute relative-motion-detection logic 610 to detect one or more motions of each of the first detector 602 and the second detector 604. The processor 606 may be further configured to execute the relative-motion-detection logic 606 to detect, based on the detected motions of each detector, one or more predetermined relative motions of the first detector 602 and the second detector 604. The processor 606 may be further configured to execute the relative-motion-detection logic 612 to detect a speed of the detected motions and relative motions.

In some embodiments, the predetermined relative motions may include movement in opposite directions, movement in the same direction, no relative movement, or combinations thereof. In some embodiments, the movements may include linear motions, such as upward motion, downward motion, leftward motion, rightward motion, forward motion, backward motion, and no motion. In some embodiments, the movements may include circular motions, such as arcs and curves. In some embodiments, the movements may include a combination of motions, such as back-and-forth and start-stop-start motions. In some embodiments, the movements may include one or more shapes and/or characters, such as letters of the alphabet. In some embodiments, the predetermined relative motions may include known movements of a hand, such as American Sign Language or typing on a standard QWERTY keyboard. Other predetermined motions are possible as well. An example of detecting a predetermined relative motion is described below in connection with FIGS. 7a-7b.

In some embodiments, the processor 606 may detect that neither of the first detector 602 and the second detector 604 are moving (or are moving very little). In these embodiments, the detected relative motion may be "no relative movement." For example, a user of the device 600 may be using both the first detector 602 and the second detector 604 to point at a particular object or in a particular direction.

In these embodiments, the processor 606 may be further configured to use one of the detectors, such as the first detector 602, to detect a narrower view, and to use the other of the detectors, such as the second detector 604, to detect a wider view. The processor 606 may be further configured to compare the narrower and wider views to detect an object that is approximately centered in each of the narrow and wide views. The detected object may be the object at which the user of the device 600 is pointing.

Additionally, the processor 606 may be configured to determine a direction, such as a cardinal direction, in which the user of the device 600 is pointing. In some embodiments, this may involve detecting an object that is approximately centered in each of the narrow and wide views and determining a cardinal direction in which the user would have to move to reach the detected object. To this end, the device 600 may additionally include a compass or other directional sensor.

The processor 606 may be further configured to execute function logic 614 to trigger one or more functions upon detection of particular predetermined relative motions. To this end, the function logic 614 may be executable by the processor to look up one or more detected predetermined relative motions in a set of correlations, such as correlations 616. Correlations 616 may be correlations between a plurality of predetermined relative motions and a plurality of functions. By looking up the one or more detected predetermined relative motions in the correlations 616, the processor 606 may determine one or more functions that are correlated with the predetermined relative motion(s). As an example, if the detected predetermined relative motion is "no relative motion," as described above, the one or more correlated functions may include performing an image or text search on the detected object, or informing the user of the device 600 of the cardinal direction. Other examples are possible as well.

Upon determining one or more functions that are correlated with the predetermined motion(s), the processor 606 may trigger one or more of the one or more functions by sending instructions to the display via the output interface 618. To this end, the output interface 618 may be communicatively coupled to the display via one or more of a wired and a wireless link. An example of triggering a function based on detection of a predetermined relative motion is described below in connection with FIGS. 7c-7d.

While the correlations 616 are shown to be stored in the data storage 608 of the device 600, in some embodiments the correlations 616 may be stored remotely and may be accessible by the device 600. In some embodiments, the correlations 616 may be static and predefined by, for example, a manufacturer of the device. Alternately, the correlations 616 may be configured by a user during set-up or use of the device. Alternately, the correlations 616 may be automatically modified by the device itself. As an example, the processor 606 may be configured to "learn" new correlations through pattern recognition or other means. Other types of correlations are possible as well.

In some embodiments, the processor 606 may be configured to execute one or more additional sets of logic stored in the data storage 608.

The device 600 may include elements instead of and/or in addition to those shown.

FIGS. 7a-7d show an example application of an example system detecting relative motion with two detectors. In particular, FIGS. 7a-7d illustrate a process of a processor executing relative-motion-detection logic to detect a predetermined relative motion of a first detector and a second detector and using function logic to trigger a function upon detection of the predetermined relative motion. The images shown in the figures are merely illustrative and are not intended to be limiting in any way.

In FIG. 7a, a first detector is shown to be located at a first position 702. The first detector may record one or more images while located at the first position 702, as described above. Similarly, a second detector is shown at a first position 704. The second detector may record one or more images while located at the first position 704, as described above.

Based on the image(s) recorded by each of the detectors, the processor may determine that the first detector is located to the left (as shown) of the right detector.

In FIG. 7b, the first detector is shown to have moved to a second position 706. The first detector may record one or more images while located at the second position 706, as described above. Additionally, a processor may compare one or more images recorded at the first position 702 with one or more images recorded at the second position 706 to detect motion of the first detector, as described above. In the example shown, the processor may detect that the first detector has moved to the left in space.

Also in FIG. 7b, the second detector is shown to have moved to a second position 708. The second detector may similarly record one or more images while located at the second position 708, and the processor may compare one or more images recorded at the first position 704 with one or more images recorded at the second position 708 to detect motion of the second detector, as described above. In the example shown, the processor may detect that the second detector has moved to the right in space.

The processor may thus detect motion of each of the first detector and the second detector. By comparing the detected motion of the first detector with the detected motion of the second detector, the processor may determine a relative motion of the first detector and the second detector. In the example shown, the processor may determine that the first detector has moved to the left and the second detector has moved to the right. Because the processor previously determined that the first detector was located to the left of the second detector, the processor may conclude that the first detector and the second detector have horizontally moved apart from one another, as shown. "Horizontally moving apart" may be a predetermined relative motion.

In some embodiments, the processor may be further configured to compare the detected motion of the first detector and the detected motion of the second detector with a statistical model in order to detect the predetermined relative motion. As an example, the processor may determine that the first detector and the second detector moved horizontally apart as well as vertically apart. By comparing the detected motions of the first and second detectors with a statistical model, the processor may determine that the most likely predetermined relative motion is "horizontally moving apart". In some embodiments, one or more statistical models may be stored in data storage at the device. Alternately or additionally, one or more statistical models may be stored remotely and may be accessible by the device. Such statistical models may be static and predefined by, for example, a manufacturer of the device. Alternately or additionally, the statistical models may be continuously updated based on user behavior or other feedback from the processor. Other statistical models are possible as well.

In some embodiments, the processor may additionally be configured to determine a first distance between the first position 702 of the first detector and the first position 704 of the second detector based on one or more of the images recorded by each of the detectors at the first positions and to determine a second distance between the second position 706 of the first detector and the second position 708 of the second detector based on one or more of the images recorded by each of the detectors. By comparing the first distance and the second distance, the processor may determine whether the first detector and the have moved towards one another or away from one another. In some embodiments, the first distance and the second distance may be measured in known units of some kind, such as millimeters, and a quantitative comparison of the first and second positions may be made. Alternately, the distances may be measured in arbitrary units and a qualitative comparison (e.g., closer or further) of the first positions and the second positions may be made.

In some embodiments, the processor may be further configured to determine a speed of the detected relative motion of the first detector and the second detector.

While only two positions of the first detector and two positions of the second detector are shown, it is to be understood that the same principle of relative-motion detection may be applied to any number of positions of the first detector and/or second detector.

Thus, the processor may execute the relative-motion-detection logic to detect relative motion of the first detector and the second detector. The processor may additionally execute the relative-motion-detection logic to detect one or more predetermined relative motions among the detected relative motions of the first detector and the second detector. In the example, the processor may detect that the relative motion of the first detector and the second detector (horizontally moving apart from one another) is a predetermined relative motion.

The processor may be additionally configured to look up the predetermined relative motion ("horizontally moving apart") in a set of correlations in order to determine a function. In the example, the predetermined relative motion may be correlated with the function of zooming in on a display.

In embodiments where one or more distances are determined between positions of the first detector and the second detector, the predetermined relative motion may be correlated with more than one function, and the processor may select between the functions based on the one or more distances. For example, the predetermined motion may be correlated with both a small zoom-in function (e.g., 125%) and a large zoom-in function (e.g., 200%). In order to select between the small zoom-in function and the large zoom-in function, the processor may determine a difference between the one or more distances (e.g., a difference between the first distance and the second distance) and may compare the difference to a predetermined threshold. In the example, if the difference is less than or equal to the predetermined threshold, the small zoom-in function may be selected, while if the difference is greater than the predetermined threshold the large zoom-in function may be selected. Other examples are possible as well.

In embodiments where a speed of the relative motion of the first detector and the second detector is determined, the predetermined relative motion may be correlated with more than one function, and the processor may select between the functions based on the determined speed. For example, the processor may select between a small zoom-in function and a large zoom-in function based on a comparison of the determined speed to a predetermined threshold. Other examples are possible as well.

FIG. 7c shows the display 710 before the processor detects the predetermined relative motion. Based on detection of the predetermined motion, the processor may trigger the correlated function. In the example, the processor may trigger a page zoom (zoom in) on the display, as shown in FIG. 7d.

The example shown in FIGS. 7a-7d is merely illustrative and is not meant to be limiting. Many other devices, predetermined relative motions, functions, and correlations between predetermined relative motions and functions are possible beyond those shown in FIGS. 7a-7d. As an example, one or more additional detectors may be used record at least one additional series of images. In this example, the processor may additionally use the relative-motion-detection logic to detect at least one predetermined relative motion of the at least one additional detector, the first detector, and the second detector by comparing at least one image in the first series of images with at least one image in the second series of images and at least one image in the at least one additional series of images. Other examples are possible as well.

5. First Example Method

Figure 8:
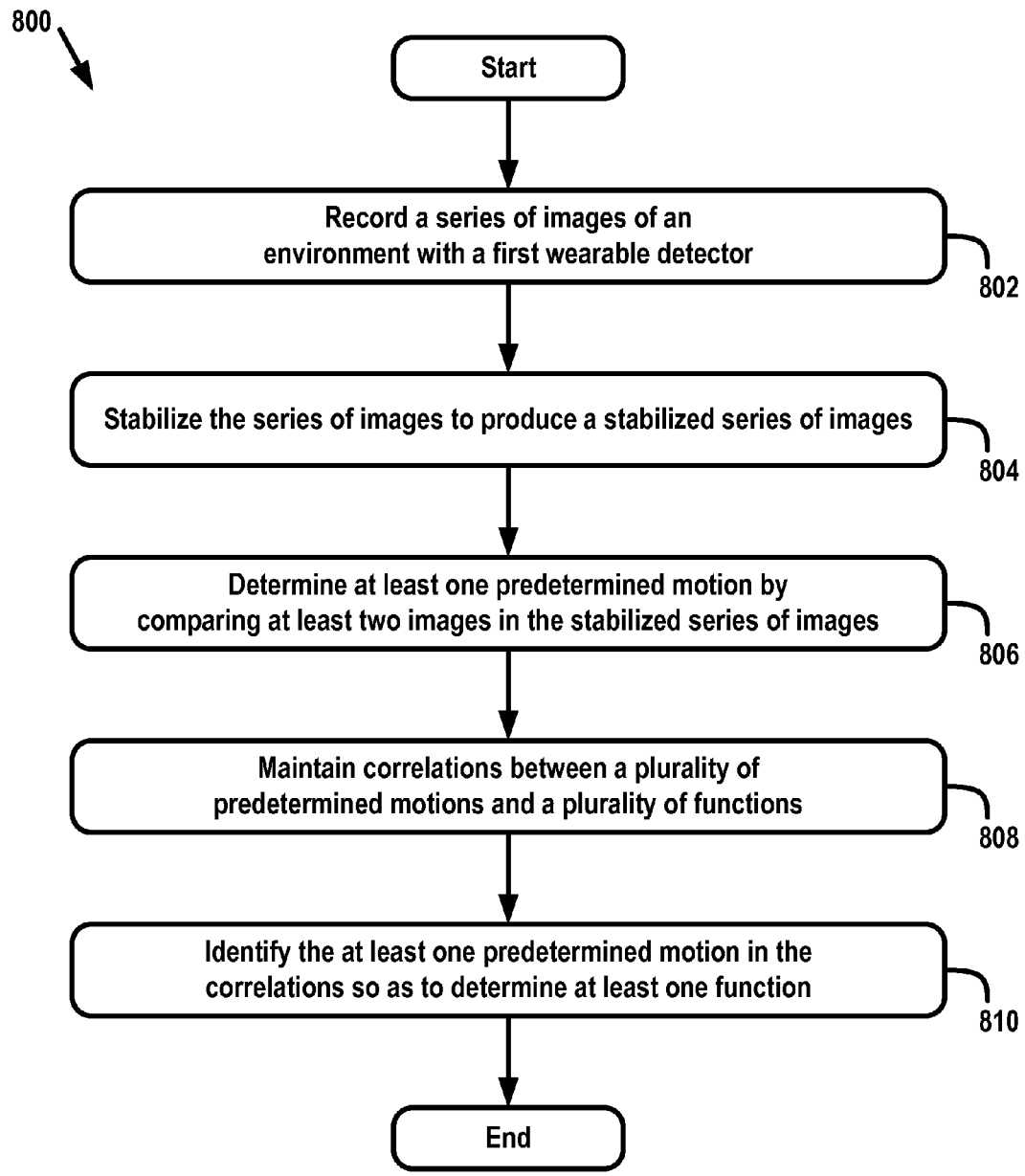
FIG. 8 is an example block diagram of a method of operating a device, in accordance with at least some embodiments described herein

FIG. 8 is an example block diagram of a method of operating a device, in accordance with at least some embodiments described herein. Method 800 shown in FIG. 8 presents an embodiment of a method that, for example, could be used with systems and devices described herein. Method 800 may include one or more operations, functions, or actions as illustrated by one or more of blocks 802-810. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 800 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 800 and other processes and methods disclosed herein, each block in FIG. 8 may represent circuitry that is wired to perform the specific logical functions in the process.

As shown, the method 800 begins at block 802 where a wearable detector is used to record a series of images of an environment. The environment may be, for example, the environment surrounding a user. In some embodiments, the environment may be an electronic display. Other environments are possible as well.

At block 804, the device stabilizes the series of images recorded by the detector to produce a stabilized series of images, as described above.

At block 806, the device determines at least one predetermined motion by comparing at least two images in the stabilized series of images. As described above, the device may execute motion-detection logic to detect the at least one predetermined motion.

At block 808, the device maintains correlations between a plurality of predetermined motions and a plurality of functions. In some embodiments, the correlations may be static and predefined by, for example, a manufacturer of the device. Alternately or additionally, the correlations may be configured by a user during set-up or use of the device. Alternately or additionally, the correlations may be automatically modified by the device itself, such as by "learning" new correlations through pattern recognition or other means. Other correlations are possible as well.

At block 810, the device identifies the at least one predetermined motion in the correlations so as to determine at least one function associated with the at least one predetermined motion. In some embodiments, the device may then trigger the at least one function.

In some embodiments, the at least one predetermined motion may be correlated with more than one function. In these embodiments, the device may trigger each of the functions, may trigger some of the functions, or may trigger only one of the functions. The device may select among the functions randomly, or the device may consider other information in determining which and how many functions to trigger. As an example, the device may consider previous functions triggered by the device. As another example, the device may perform image recognition on the series of images in order to recognize one or more objects in the series of images and may consider one or more of the recognized objects. As still another example, the device may detect a speed or distance of the motion, as described above, and may consider one or both of the speed or distance. Other examples are possible as well.

The method 800 may be carried out periodically, continuously, as needed, as triggered, or in another manner.

6. Second Example Method

Figure 9:
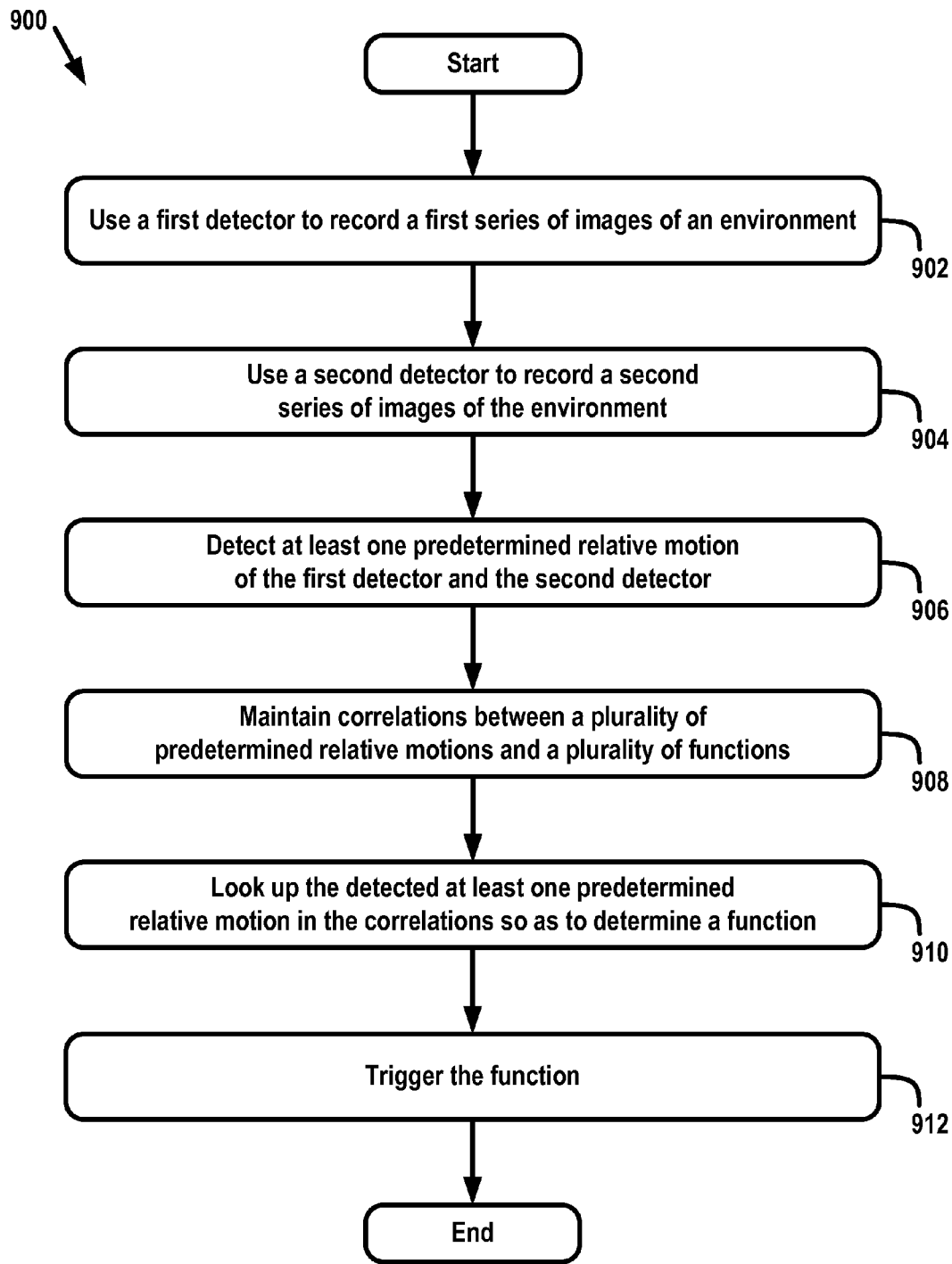
FIG. 9 is an example block diagram of another method of operating a device, in accordance with at least some embodiments described herein

FIG. 9 is an example block diagram of another method of operating a device, in accordance with at least some embodiments described herein. Method 900 shown in FIG. 9 presents an embodiment of a method that, for example, could be used with systems and devices described herein. Method 900 may include one or more operations, functions, or actions as illustrated by one or more of blocks 902-912. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

As shown, the method 900 begins at block 902 where a first detector is used to record a first series of images of an environment. The first series of images may include one or more images, and the images may be recorded at a constant or varying rate. The rate may be preselected by, for example, a manufacturer of the device. Alternately or additionally, the rate may be selected or modified by a user of the device. Alternately or additionally, the device may automatically adjust the rate based on one or more factors such as, for example, a determined speed of the first detector. Other examples are possible as well.

At block 904, a second detector is used to record a second series of images of the environment. The second series of images may include one or more images, and the images may be recorded at a constant or varying rate. The rate may be preselected by, for example, a manufacturer of the device, may be selected or modified by a user of the device, and/or may be automatically adjusted by the device based on one or more factors.

In some embodiments, the first detector and the second detector may record images at the same rate. In other embodiments, the first detector and the second detector may each record images at a rate independent of the rate of the other. Other examples are possible as well.

At block 906, the device may detect at least one predetermined relative motion of the first detector and the second detector. This may involve the device comparing at least one image in the first series of images with at least one image in the second series of images, as described above. In some embodiments, prior to block 906, the device may stabilize one or both of the first series of images and the second series of images to produce one or both of a first stabilized series of images and a second stabilized series of images, as described above. In these embodiments, block 906 may involve the device comparing at least one image in the first stabilized series of images with at least one image in the second stabilized series of images.

At block 908, the device may maintain correlations between a plurality of predetermined relative motions and a plurality of functions. In some embodiments, the correlations may be static and predefined by, for example, a manufacturer of the device. Alternately, the correlations may be configured by a user during set-up or use of the device. Alternately, the correlations may be automatically modified by the device itself, such as by "learning" new correlations through pattern recognition or other means. Other correlations are possible as well.

At block 910, the device may look up the detected at least one predetermined relative motion in the correlations so as to determine the function and, at block 912, the device may trigger the function. As described above, in some embodiments, the at least one predetermined relative motion may be correlated with more than one function. In these embodiments, the device may trigger each of the functions, may trigger some of the functions, or may trigger only one of the functions. Selection among the functions may be random or may be based on additional information, as described above.

The method 900 may be carried out periodically, continuously, as needed, as triggered, or in another manner.

In some embodiments, one or more of the above-described devices may be further configured to store one or more series of recorded images. Alternately or additionally, the device(s) may be configured to transmit one or more series of recorded images to a remote device for storage. In some embodiments, the stored series of images may be used by the device, the remote device, or another device to analyze long-term movement of a detector. An example application for such analysis may be diagnosing arthritis in a user's hand. Other applications are possible as well.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A glove, comprising:
    a first detector configured to record a first series of images of an environment;
    a second detector configured to record a second series of images of the environment;
    a processor configured to (i) determine at least one predetermined motion of the first detector by comparing at least two images in the first series of images, (ii) based on the at least one predetermined motion, select a first at least one function from a plurality of functions, (iii) determine at least one predetermined relative motion of the first detector and the second detector by comparing at least one image in the first series of images with at least one image in the second series of images, and, (iv) based on the at least one predetermined relative motion, select a second at least one function from the plurality of functions; and
    an output interface configured to trigger the first at least one function and the second at least one function.

2. The glove of claim 1, wherein the output interface being configured to trigger the first at least one function comprises the output interface being configured to trigger the first at least one function to be carried out on a display.

3. The glove of claim 2, wherein the display comprises at least one of a wearable display that is wearable by a user and a remote display that is remote from the glove.

4. A wearable device, comprising:
a first detector configured to record a first series of images of an environment;
a second detector configured to record a second series of images of the environment;
a processor configured to (i) determine at least one predetermined motion of the first detector by comparing at least two images in the first series of images, (ii) based on the at least one predetermined motion, select a first at least one function from a plurality of functions, (iii) determine at least one predetermined relative motion of the first detector and the second detector by comparing at least one image in the first series of images with at least one image in the second series of images, and, (iv) based on the at least one predetermined relative motion, select a second at least one function from the plurality of functions; and
an output interface configured to transmit an output based at least in part on the first at least one function and the second at least one function.

5. The wearable device of claim 4, further comprising an orientation sensor configured to sense motion of the first detector.

6. The wearable device of claim 5, wherein the processor is further configured to stabilize the first series of images based on the motion of the first detector.

7. The wearable device of claim 4, wherein the output interface is further configured to transmit the output to a display that comprises at least one of a wearable display that is wearable by a user and a remote display that is remote from the wearable device.

8. The wearable device of claim 4, wherein the processor being configured to, based on the at least one predetermined motion, select the first at least one function from a plurality of functions comprises the processor being configured to look up the at least one predetermined motion in a set of correlations so as to determine the first at least one function.

9. The wearable device of claim 4, wherein the output interface being configured to transmit an output based at least in part on the first at least one function comprises the output interface being configured to trigger the first at least one function to be carried out on a display.

10. The wearable device of claim 4, further comprising at least one additional detector configured to record at least one additional series of images.

11. The wearable device of claim 10, wherein the processor is further configured to detect at least one predetermined relative motion of the at least one additional detector, the first detector, and the second detector by comparing at least one image in the first series of images with at least one image in the second series of images and at least one image in the at least one additional series of images.

12. A method, comprising:
recording a first series of images of an environment with a first wearable detector;
determining at least one predetermined motion by comparing at least two images in the first series of images;
maintaining a first set of correlations between a plurality of predetermined motions and a first plurality of functions; and
identifying the at least one predetermined motion in the first set of correlations so as to determine a first at least one function associated with the at least one predetermined motion;
recording a second series of images of the environment with a second wearable detector;
determining at least one predetermined relative motion of the first wearable detector and the second wearable detector by comparing at least one image in the first series of images with at least one image in the second series of images;
maintaining a second set of correlations between a plurality of predetermined relative motions and a second plurality of functions; and
identifying the at least one predetermined relative motion in the second set of correlations so as to determine a second at least one function associated with the at least one predetermined relative motion.

13. The method of claim 12, further comprising triggering the first at least one function.

14. The method of claim 12, further comprising triggering the second at least one function.

15. The method of claim 12, wherein at least one of the first at least one function and the second at least one function comprises at least one of entering at least one character in an application displayed by a display, zooming in on the display, zooming out on the display, scrolling on the display, panning on the display, moving an indicator on the display, selecting an object displayed by the display, using image recognition to identify at least one object in the environment, searching for information related to the at least one object, displaying information related to the at least one object on the display, identifying a cardinal direction, and displaying the cardinal direction on the display.

16. The method of claim 12, wherein the first at least one function comprises at least a first function and a second function, and the method further comprises:
selecting between the first function and the second function based on one or more of a determined speed of one of the first detector or the second detector, a determined distance moved by one of the first detector or the second detector, an object identified in at least one image in the series of images, and one or more previously-triggered functions; and
triggering the selected function.

* * * * *